United States Patent [19]

Naito

[11] Patent Number: 4,790,404
[45] Date of Patent: Dec. 13, 1988

[54] CONTROL SYSTEM FOR LIMITED-SLIP DIFFERENTIAL GEAR UNIT ASSOCIATED WITH WHEEL-SPINNING PREVENTIVE TRACTION CONTROL SYSTEM

[75] Inventor: Genpei Naito, Kanagawa, Japan

[73] Assignee: Nissan Motor Company, Limited, Kanagawa, Japan

[21] Appl. No.: 25,171

[22] Filed: Mar. 12, 1987

[30] Foreign Application Priority Data

Mar. 13, 1986 [JP] Japan .................... 61-55880

[51] Int. Cl.$^4$ .................. B60K 23/04; B60K 31/00
[52] U.S. Cl. ..................... 180/197; 74/710.5
[58] Field of Search ............... 180/197, 6.24, 6.26; 74/710.5, 711

[56] References Cited

U.S. PATENT DOCUMENTS

| | | | |
|---|---|---|---|
| 3,138,970 | 6/1964 | Costa et al. ................. | 74/711 |
| 3,893,535 | 7/1975 | Burckhardt et al. .......... | 180/197 |
| 4,162,712 | 7/1979 | Nelson ....................... | 180/253 |
| 4,523,494 | 6/1985 | Sparks et al. ................ | 74/710.5 |
| 4,583,424 | 4/1986 | von Hiddessen ............. | 74/710.5 |
| 4,671,373 | 6/1987 | Sigl ........................... | 180/197 |

FOREIGN PATENT DOCUMENTS

| | | |
|---|---|---|
| 3212495 | 10/1983 | Fed. Rep. of Germany . |
| 59-68537 | 4/1984 | Japan . |
| 60-143135 | 7/1985 | Japan . |
| 144730 | 3/1962 | U.S.S.R. ................. 74/710.5 |
| 593944 | 1/1978 | U.S.S.R. ................. 180/197 |
| 587019 | 1/1978 | U.S.S.R. ................. 74/710.5 |
| 835844 | 6/1981 | U.S.S.R. ................. 74/710.5 |

OTHER PUBLICATIONS

Jidosha Kogaku Zensho, vol. No. 9, "Power Train Device", Nov. 15, 1980, pp. 321–324.

Primary Examiner—John A. Pekar
Attorney, Agent, or Firm—Foley & Lardner, Schwartz, Jeffery, Schwaab, Mack, Blumenthal & Evans

[57] ABSTRACT

A control system for a limited-slip differential gear unit is cooperative with a traction control system to provide better vehicle driving stability. The control system for a limited-slip differential gear unit is capable of optimizing driving torque transmission characteristics for improving cornering stability of the vehicle. The limited-slip differential gear unit control system, according to the invention, is operative in response to difference of wheel slippages at driven wheels for slip limiting force in order to adjust wheel slippage of heavier load driven wheel at a predetermined value. The control system is cooperative with a traction control system which is detective of wheel slippage due to wheel spinning caused by excessive driving torque to be applied to the driven wheels and adjusting the driving torque to be distributed to the driven wheels.

10 Claims, 6 Drawing Sheets

CONTROL SYSTEM FOR LIMITED-SLIP DIFFERENTIAL GEAR UNIT ASSOCIATED WITH WHEEL-SPINNING PREVENTIVE TRACTION CONTROL SYSTEM

BACKGROUND OF THE INVENTION

1. Field of the Invention

The present invention relates generally to a control system for controlling operation of a limited-slip differential gear unit. More specifically, the invention relates to a limited-slid differential gear unit control system cooperative with a wheel-spinning preventive drive control system for adjusting driving torque to be applied to driven wheel of the vehicle.

2. Description of the Background Art

Conventional limited-slip differential gear unit has been disclosed in "Jidosha Kogaku Zensho" Vol. No. 9, "Power Train Device", published on Nov. 15, 1980, by Kabushiki Kaisha Sankaido, on pages 321 to 324, for example.

Such conventional limited-slip differential gear unit employs a slip-limiting mechanism which comprises multi-plate friction clutches. The multiplate friction clutches are interposed between a differential casing and side gears. For the multiplate friction clutch, a thrusting force generated by a cam mechanism provided on a pinion mate shaft depending upon driving torque, is applied as a clutch engaging force. According to the clutch engaging force thus generated, slip-limiting torque is generated by the slip-limiting mechanism. Such type of slip-limiting mechanism has been known as "torque-proportional type slip-limiting mechanism".

On the other hand, traction control systems have been developed for adjusting driving torque to be applied to driven wheels for preventing the driven wheels from causing wheel-spinning in order to optimize vehicular performance. In general, wheel slippage is reflected in a difference of an actual vehicle speed and an assumed vehicle speed derived based on a wheel speed. When the actual vehicle speed is lower than the assumed vehicle speed, it means the driven wheel is caused to spin. On the other hand, when the actual vehicle speed is higher than the assumed vehicle speed, it means the vehicle wheel is skidding. Wheel-spinning is caused by loss of road/tire traction. Therefore, in such a case, traction control has to be performed in order to prevent the vehicular wheel from spinning. On the other hand, wheel-skidding occurs during application of abrupt braking and is caused by locking of the wheel. For example, such traction controls have been disclosed in U.S. Pat. No. 3,893,535, issued on July 8, 1975, to M. H. Burckhardt, et al. and in Japanese Patent First Publication (Tokkai Showa) 59-68537, published on Apr. 18, 1984. In both cases, a rotation speed of a driven wheel which is driven by an engine output is compared with a rotation speed of a non-driven wheel which rotates freely. The rotation speed of the non-driven wheel is treated as a parameter reflecting an actual vehicle speed.

Such conventional limited-slip differential gear units and the the traction control systems can provide better vehicular driving performance when they are observed independently. For instance, the limited-slip differential gear unit may adjust distribution of driving torque between higher load wheel and lower load wheel by limiting slip in the differential gear unit so that driving torque distribution should not be too concentrated to the low load wheel. On the other hand, the traction control system may provide optimum driving torque for driven wheels in order to maintain driving stability and road/tire traction at reasonable level. As will be appreciated better drivability may be obtained by cooperating the slip control system for limited-slip differential gear unit and the traction control system set forth above.

Such slip control system for a limited-slip differential gear unit cooperated with drive torque control system has also been disclosed in the Japanese Patent First (unexamined) Publication (Tokkai) No. 60-143135, published on July 29, 1985. In the disclosed system, the limited-slip differential gear control system is cooperated with a traction control system. The slip control for the limited-slip differential gear unit becomes active for establishing locking of the differential gear unit for limiting slip therein for adjustment of the driving torque distribution in such vehicle driving condition that there is high possibility of wheel-spinning due to excessive driving torque to be exerted on driven wheels. On the other hand, the slip control for the differential gear unit is deactivated when steering angular displacement is greater than a given angle or steering behavior causes lateral force greater than a given magnitude, or the difference of rotation speeds of driving torque becomes greater than a given value, throttle valve angular position is fully closed or near fully closed position, or the brake is applied.

As will be appreciated herefrom, the system disclosed in the Japanese Tokkai Showa 60-143135 cannot provide sufficient force reactive on the lateral force which is created during cornering or turning of the vehicle, by limiting slip in the differential gear unit for increasing driving torque to be distributed to the driven wheels. Namely, in the disclosed system, since the slip limitation of the differential gear unit is not active while the vehicle is curving or turning by operating steering at an angle greater than the given angle the distribution rate of driving torque of the engine to the inner and lighter load wheel is increased. The traction control becomes active at this condition due to a greater difference of the wheel speeds between the driven wheels than a given value. Therefore, the driving torque to be distributed to the driven wheel may be further reduced to degrade vehicular acceleration characteristics. On the other hand, even when the slip-limited differential gear unit is locked during cornering or turning, the slip ratio at the outer driven wheel will become greater than that in an unlocking condition, since the traction control will never be initiated.

SUMMARY OF THE INVENTION

Therefore, it is an object of the present invention to provide a control system for a limited-slip differential gear unit, which is cooperative with a traction control system to provide better vehicle driving stability.

Another object of the invention is to provide a control system for a limited-slip differential gear unit which can optimize driving torque transmission characteristics for improving cornering stability of the vehicle.

In order to accomplish the aforementioned and other objects, a limited-slip differential gear unit control system, according to the invention, is operative in response to difference of wheel slippages at driven wheels for slip limiting force in order to adjust wheel slippage of heavier load driven wheel at a predetermined value.

The control system is cooperative with a traction control system which is detective of wheel slippage due to wheel spinning caused by excessive driving torque to be applied to the driven wheels and adjusting the driving torque to be distributed to the driven wheels.

According to one aspect of the invention, a differential gear control system for an automotive vehicle which facilitates a traction control system for adjusting driving torque to be transmitted to driven wheel depending upon wheel slippage, comprises a differential gear unit disposed within a vehicular power train for distributing a driving torque to first and second driven wheels, a slip-limiting means, associated with the differential gear unit, for adjusting distribution ratio of drive torque for the first and second wheels, the slip-limiting means being variable of the distribution ratio of the driving torque according to a slip control signal value, a steering sensor monitoring steering behavior of a vehicular steering to produce a sensor signal indicative of a steering direction and a magnitude of steering angular displacement, a differential gear control means receiving the steering angle signal for identifying first and second driven wheels, in which the first driven wheel is located at inside with respect to the curve and the second wheel is located at outside with respect to the curve, and producing the slip control signal for adjusting slip ratio of the second wheel at a given set value when a wheel speed at the first driven wheel is higher than that at the second wheel, the control means being response to the wheel speed at the first wheel higher than that at the second wheel to output a traction control disabling signal for disabling traction control.

The differential gear control means detects a substantially straight vehicle travelling direction on the basis of the sensor signal to set the slip ratio at a maximum ratio. On the other hand, the differential control means is detective of a vehicle driving condition wherein the vehicle travels through a curve and the wheel speed at the first wheel is smaller than or equal to that at the second wheel, to output the slip control signal for substantially disabling slip-limitation in the differential gear unit. The differential gear control means is further detective of slip ratio at the second wheel smaller than or equal to the set ratio to increase slip limitation by a given magnitude.

In the preferred embodiment, the slip-limiting means comprises a hydraulic clutch assembly adjustable of engaging pressure and a hydralic actuator associated with the hydraulic clutch for adjusting the engaging pressure for controlling the slip-limiting torque. The hydraulic clutch assembly comprises a first clutch interposed between an input shaft of the limited-slip differential gear unit and a first output shaft for driving one of the driven wheel and a second clutch interposed between the input shaft and a second output shaft for driving the other of the driven wheel, and the first and second clutches are respectively cooperated with the hydraulic actuator to be adjusted the engaging pressure. The hydraulic actuator comprises a piston exerting pressure for the first and second clutches for establishing the engaging pressure and a valve means for adjusting fluid pressure exerted on the piston, which valve means adjusts the fluid pressure according to the differential control signal. The valve means may be connected to a fluid pressure source including a fluid pump which is controlled operation by the controller. The fluid pump is controlled to be driven only in a predetermined vehicle driving condition which requires differential operation.

DESCRIPTION OF THE PREFERRED EMBODIMENT

Figure 1:
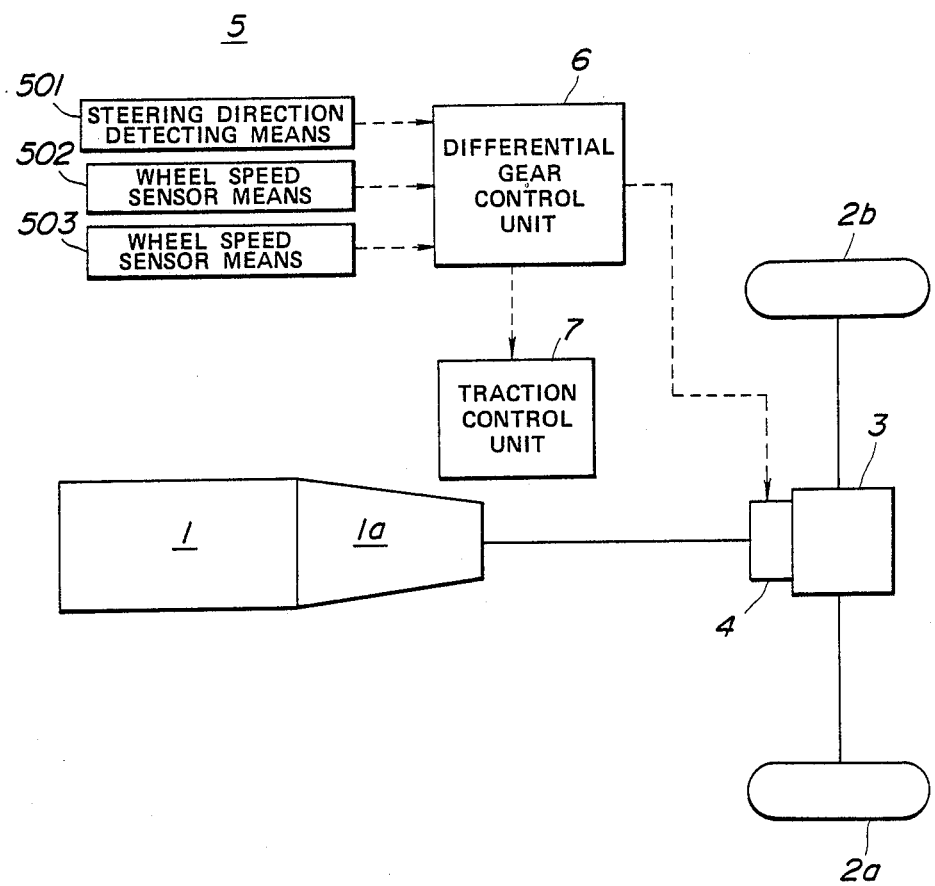
FIG. 1 is a schematic block diagram of the preferred embodiment of a limited-slip differential gear unit control system, according to the invention, showing fundamental construction of the control system.

Referring now to the drawings, particularly to FIG. 1, the fundamental construction of the preferred embodiment of a limited-slip differential gear control system, according to the present invention will be discussed in advance of the details of the preferred embodiment in order to facilitate better understanding of the invention. The preferred embodiment of the limited-slip differential gear control system includes a limited-slip differential gear unit 3 interposed between the left and right driven wheels 2a and 2b for distributing driving torque of an automotive internal combustion engine 1. The differential gear unit 3 receives the engine torque through a power train including a power transmission 1a. The differential gear unit 3 is associated with a slip control unit 4 which is designed for controlling slip in the differential gear unit. The slip control unit 4 is connected to a differential gear control unit 6 for adjusting engaging torque of a slip control clutch incorporated in the differential gear unit 3 for adjusting slip-limitation of the differential gear unit, according to a control signal from the control unit.

The differential gear control unit 6 is connected to sensors for monitoring preselected differential gear control parameters. In the preferred embodiment, steering direction and rotation speeds of the driven wheels 2a and 2b. In order to monitor these differential gear control parameters, a steering direction detecting means 501, a wheel speed sensor means 502 for monitoring rotation speed of the left driven wheel 2a and a wheel speed sensor means 503 for monitoring rotation speed of the right driven wheel 2b. The steering direction detecting means 501 monitors direction of the steering angle displacement to produce a steering direction indicative signal. The wheel speed sensor means 502 and 503 monitors rotation speeds of the left and right driven wheels 2a and 2b to produce left and right wheel speed indicative signals.

It should be appreciated that the word "slip-limitation" used throughout the disclosure means limitation of the difference in driving torque distribution between left and right wheels. "Lower slip-limitation" means smaller limitation of the difference in torque distribution to allow greater difference. "Higher slip-limitation" means greater limitation for difference in torque distribution allowing smaller difference.

On the other hand, the differential gear control unit 6 is connected to a control unit 7 of a traction control system which controls driving troque to be transmitted to driven wheels for maintaining the driving stability of the vehicle at an optimum level and avoiding excessive driving torque which can cause wheel spinning, to be applied to the driven wheels. The traction control system generally detects wheel slippage on the basis of the wheel speed relative to a vehicle speed representative value. Generally, in order to derive the vehicle speed representative value, rotation speed of an non-driven wheel is generally taken. The traction control unit compares the wheel speed of the driven wheel with the vehicle speed representing value for deriving a wheel slippage indicative value. The wheel slip indicative value is compared with a given wheel slippage threshold to detect the magnitude of wheel-spinning. When the wheel-spinning magnitude is greater than a given magnitude as represented by the wheel slippage threshold, the control unit reduces driving torque to be transmitted to the driven wheels. The driving torque may be adjusted by adjusting an angular position of a throttle valve in an air induction system of the engine 1. Otherwise, the driving torque distribution to the driven wheels may be adjusted by adjusting slip in a power train for reducing the driving torque to drive the driven wheels. Such a traction control system has been disclosed in the co-pending U.S. patent application Ser. Nos. 918,125, 918,137, 918,080 and 918,081, all filed on Oct. 14, 1986 and in the co-pending German patent application No. P36 34 627.6, filed on Oct. 10, 1986, which is German counterpart of the aforementioned U.S. patent application Ser. No. 918,125. All of the co-pending applications listed hereabove have been commonly assigned to the assignee of the present invention. The disclosure of the above-listed co-pending applications are herein incorporated by reference for the sake of disclosure.

The differential gear control unit 6 detects the wheel speed of the driven wheel which is positioned at a position closer to a center of a curve of the road, which wheel will be hereafter referred to as the "inner driven wheel", being greater than the other driven wheel which resides at a position remote from the curve center and hereafter is referred to as the "outer driven wheel". This means that the slip ratio in the differential gear unit 3 for distributing the driving torque for the outer driven wheel is greater than that for the inner driven wheel. In such a case, the differential gear control unit 6 becomes active for slip-limitation in the differential gear unit for adjusting the slip ratio at the outer driven wheel by a given magnitude. While the differential gear control unit 6 is active to cause slip-limitation, the control unit outputs a disabling disabling signal to the traction control unit for disabling operation thereof.

By disabling the traction control system, the driving torque to be transmitted to the differential gear unit 3 will never be reduced by the effect of the traction control system while the differential gear control unit 6 is active. Since the slip ratio at the outer driven wheel is limited at the given magnitude by limiting slip in the differential gear unit, a driving torque will be applied to the outer driven wheel, on which a higher load is exerted during cornering. As is well known, increasing the driving torque at outer driven wheel (higher load wheel) will increase understeering characteristics of the vehicle. Increase, of the understeering characteristics will eliminate the possibility of spinning of the vehicle caused by oversteering. Therefore, by the preferred embodiment of the differential gear control system as cooperated with the traction control system, will increase cornering force and improve driving stability of the vehicle.

Figure 2:
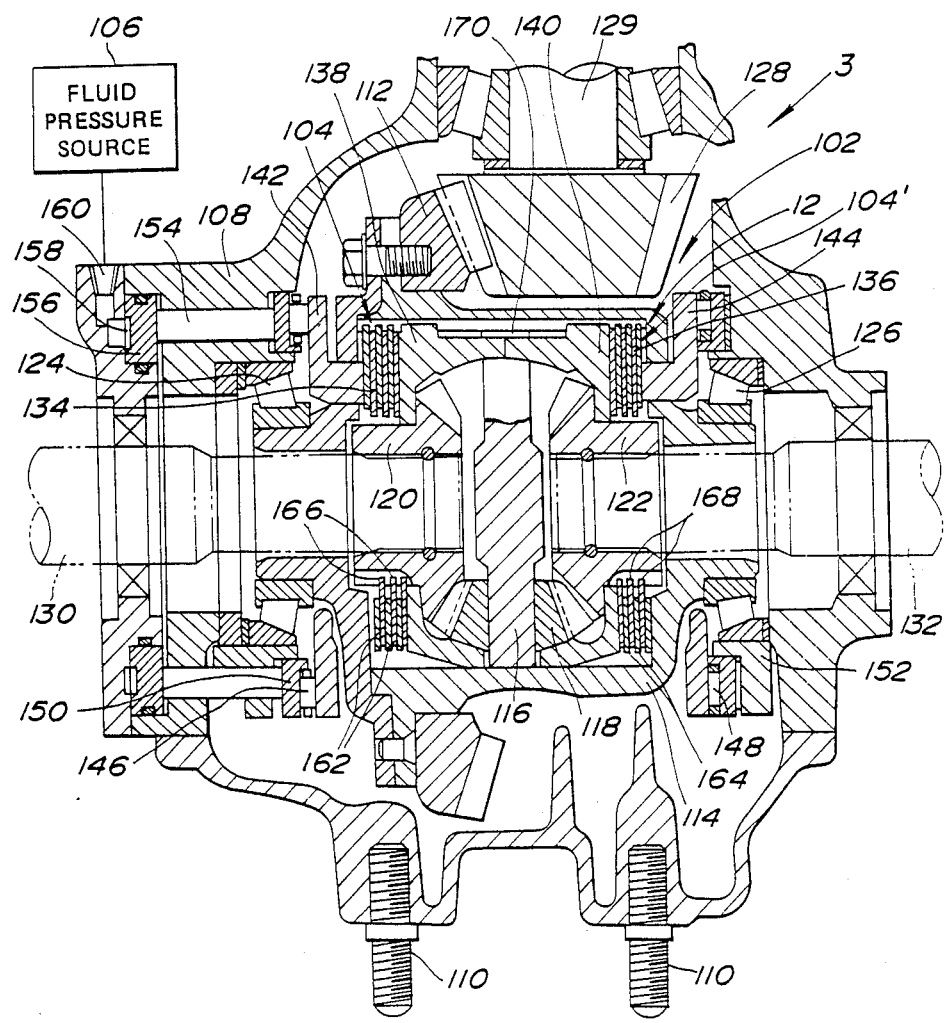
FIG. 2 is a section of a limited-slip differential gear unit to be controlled by the control system of FIG. 1.

FIG. 2 shows the preferred construction of the limited-slip differential gear unit 3. FIG. 2 shows the construction of the preferred embodiment of the limited-slip differential gear unit according to the invention, which includes the slip control unit 4. The limited-slip differential gear unit 3 generally comprises a differential gear assembly 102, multi-plate friction clutches 104 and 104' which generally serves as the slip control unit 12, a working fluid pressure source 106, and the differential gear control unit 6. As is well known, the differential gear assembly 102 allows left and right driven wheels 2a and 2b to rotate at different rotation speed when load distribution at the left and right driven wheels is different. On the other hand, when the load exerted at both of left and right wheels 2a and 2b is even, the differential gear assembly 102 distributes even driving torque to the left and right driven wheels to rotate them at even speed.

The differential gear assembly 102 is housed within a unit housing 108. The unit housing 108 is fixedly secured to a vehicle body (not shown) by means of stud bolts 110. The differential gear assembly 102 has per se known construction comprising a ring gear 112, a differential casing 114, a pinion mate shaft 116, a differential pinion gear 118 and side gears 120 and 122. The differential casing 114 is rotatable supported for rotation about the unit housing 108 via tapered roller bearings 124 and 126. The ring gear 112 is fixed to the differential casing 114 and meshed with a drive pinion 128 which is fixedly mounted on a propeller shaft 129. As is well known, the propeller shaft 129 constitute part of a power train for transmitting output torque of a power transmission (not shown) to the differential gear assembly 102. Therefore, the propeller shaft 129 serves as input shaft for the preferred embodiment of the limited-slip differential gear unit 3. In the shown embodiment, the side gear 120 is fixed to a drive shaft 130 for driving the left driven wheel 2a. Similarly, the side gear 122 is fixed to a drive shaft 132 for driving the right driven wheel 2b. These drive shafts 130 and 132 serve as output shaft of the preferred embodiment of the limited-slip differential gear unit 3.

Figure 3:
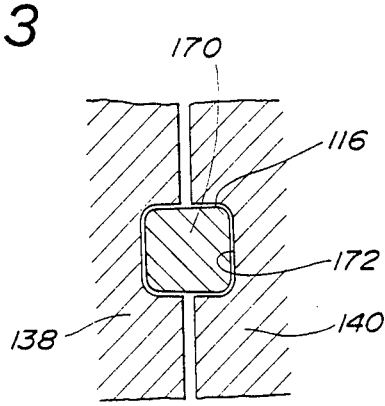
FIG. 3 is an enlarged section of the major part in the limited-slip differential gear unit of FIG. 2.

The multi-plate friction clutches 104 and 104' are interposed between the propeller shaft 129 as the input shaft and the drive shafts 130 and 132 as the output shafts. The multi-plate clutches 104 and 10' are controlled through engaging pressure by means of an external hydraulic pressure control circuit. Depending upon the engaging pressure exerted on the multi-plate friction clutch 104, the slip-limiting torque of the limited-slip differential gear unit 3 can be adjusted. The multi-plate friction clutches 104 and 104' are housed within the differential casing 114 and comprises a left clutch 134 and a right clutch 136. The left and right clutches 134 and 136 have pressure rings 138 and 140, reaction plates 142 and 144, thrust bearings 146 and 148, spacers 150 and 152, respectively. The multi-plate friction clutches 104 and 104' further comprise a push rod 154, a pressure piston 156, pressure chamber 158 and port 160. The left clutch 134 and the right clutch 136 respectively have friction plates 162 and 164 rotatable with the propeller shaft 129 and friction disks 166 and 168 rotatable with the side gears 120 and 122. The pressure rings 138 and 140 and the reaction plates 142 and 144 are arranged at axial ends of the left and right clutches 134 and 136. The pressure rings 138 and 140 are connected to the pinion mate shaft 116. As shown in FIG. 3, the end sections 170 of the pinion mate shaft 116 are formed in essentially square-shaped configurations. On the other hand, square openings 172 are defined at the mating ends of the pressure rings 138 and 140. With this construction, thrusting force will never be generated so as not to influence for adjustment of engaging pressure of the multi-plate friction clutch 104.

The pressure piston 156 has a surface opposing the pressure chamber 158 to subject working fluid pressure therein. The fluid pressure is introduced into the pressure chamber 158 through the port 160. The pressure piston 156 thrustingly shifts depending upon the fluid pressure in the pressure chamber so as to adjust engaging pressure of the left and right clutches 134 and 136. The engaging pressure exerted from the pressure piston 156 is transmitted through the pusher rod 154, spacer 150 and thrust bearing 146 to the reaction plate 142. Therefore, friction plates 162 and friction disks 166 are engaged with the engaging pressure. At this time, the pressure ring 138 serves for providing reaction force against the engaging pressure from the pressure piston 156. On the other hand, the engaging pressure is transmitted to establish engagement between he friction plates 164 and the friction disks 168. At this time, the reaction force is provided from the peripheral wall of the unit housing 108.

Figure 4:
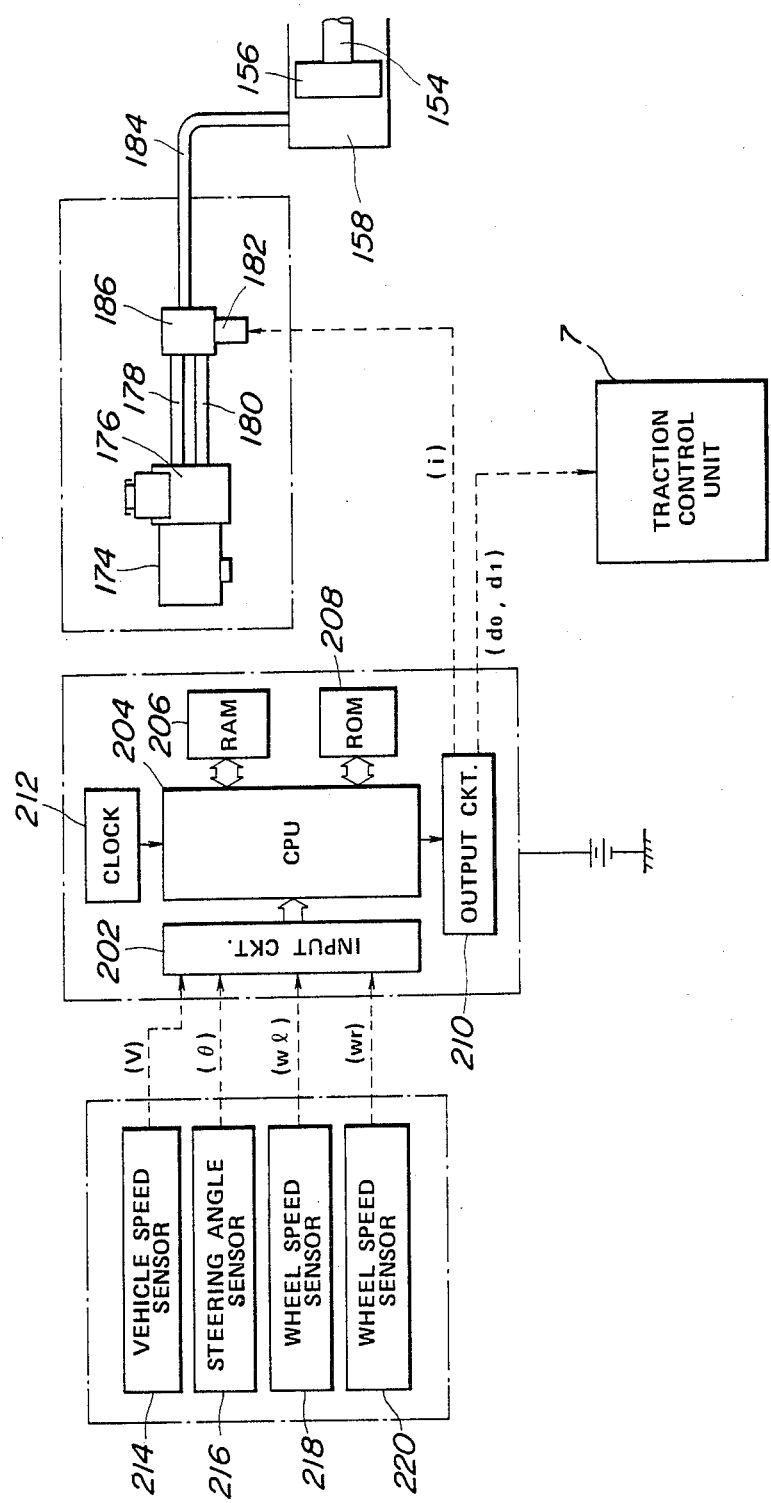
FIG. 4 is a block diagram of the preferred embodiment of the limited-slip differential gear control system showing detail of the control system.

As shown in FIG. 4, the fluid pressure source 106 comprises a pressure pump 176, a pump motor 174, a pressurized fluid passage 178, a drain passage 180 and a control pressure line 184. Between the pressurized fluid passage 178 and the control pressure line 184, a electro-magnetic proportioning pressure reduction valve 186 is provided. The drain passage 180 connects the pressure reduction valve 186 to the pressure pump 174 to recirculate the exessive pressure to the pressure pump.

The pump motor 174 is controlled by a motor control signal m from the differential gear control unit 6. Namely, the pump motor 174 is driven while the limited-slip differential gear unit 3 is in operation to distribute difference proportion of the driving torque or while the vehicle driving condition is judged to have high possibility to require differential operation. On the other hand, the pump motor 174 is held inoperative while the vehicle driving condition is judged to have no need for the differential operation, such as the vehicle resting condition. Therefore, the motor control signal m from the differential gear controller 6 serves for activating and deactivating the pump motor 174.

Figure 5:
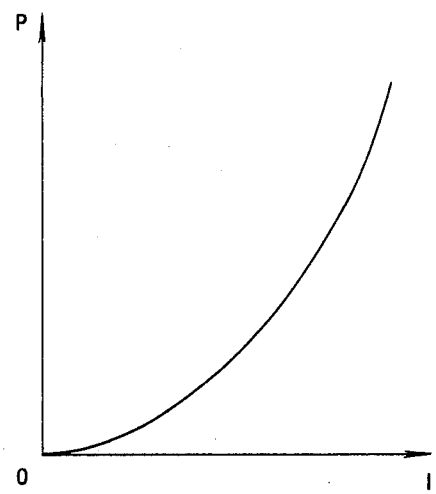
FIG. 5 is a graph showing the relationship between the engaging pressure serving as slip limiting pressure for the limited-slip differential gear unit, and a control voltage.

The pressure reduction valve 186 is also connected to the differential gear control unit 6 to receive therefrom a pressure control signal Si. The pressure control signal Si has an electric current valve I variable depending upon the required engaging pressure as derived by the differential gear control unit 6. The pressure reduction valve 186 adjusts the working fluid pressure to be distributed through the control pressure line 182 to increase the control pressure according to increase of the electric current I of the pressure control signal Si, as shown in FIG. 5. In order to adjust the fluid pressure in the control pressure line 182, a valve actuator 184 is provided in the pressure reduction valve 186 to control the valve position in response to the pressure control signal Si. Therefore, the controlled pressure is introduced into the pressure chamber 158 of the limited-slip differential gear unit 3 via the control pressure line 182 and the port 160.

Here, the control pressure P distributed through the pressure reduction valve 186 and the slip-limiting torque T created in the multi-plate friction clutch 104 is described by the following formula:

$$T\ P \times \mu \times n \times r \times A$$

where
$\mu$ is a friction coefficient between the friction plate and friction disk;
n is a number of sets of friction plate and friction disk;
r is an average radius of clutch; and
A is a pressure receiving area of the clutch.

Figure 6:
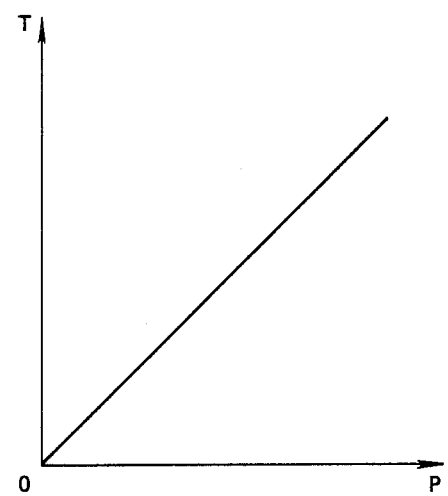
FIG. 6 is a graph showing variation of a slip-limiting torque in terms of the engaging pressure.

As will be appreciated herefrom, the slip-limiting torque T to be created by the multi-plate friction clutch 104 varies proportionally to the control pressure from the pressure reduction valve 186, as shown in FIG. 6.

In order to control the operation of the pressure reduction valve 186, the differential gear control unit 6 generally comprises a microprocessor including an input interface 202, CPU 204, RAM 206, ROM 208 and output interface 210. In addition, the microprocessor as the differential gear control unit 6 includes a clock generator 212 for generating clock pulse. The input interface 202 of the differential control gear unit 6 is connected to a vehicle speed sensor 214, a steering angle sensor 216 which serves as the steering direction detecting means 501, a wheel speed sensor 218 for monitoring the rotation speed of the left driven wheel 2a, and a wheel speed sensor 220 for monitoring rotation speed of the right driven wheel 2b. The input interface 202 is also connected to the traction control unit 7 in the traction control system.

The vehicle speed sensor 214 is designed to monitor vehicular travelling speed to produce a vehicle speed indicative signal $S_v$ indicative of the vehicle speed V. The steering angle sensor 216 monitors steering behaviour to produce a steering angle signal $S_\theta$ indicative of the magnitude of steering angular displacement $\theta$ and the direction toward which the steering operation is taken place. The wheel speed sensors 218 and 220 respectively monitor associated left and right driven wheels 2a and 2b to produce wheel speed signals $S_{wl}$ and $S_{wr}$ respectively representative of the wheel speeds Wl and Wr.

The differential gear control unit 6 derives slip rate of respective left and right driven wheels on the basis of the vehicle speed indicative signal value V and the wheel speed indicative signal values Wl and Wr. As will be appreciated that the slip rate of the driven wheels 2a and 2b may be derived from the following equations:

$$S_L = \frac{Wl - V}{Wl}$$

-continued
$$S_R = \frac{Wr - V}{Wr}$$

Figure 7:
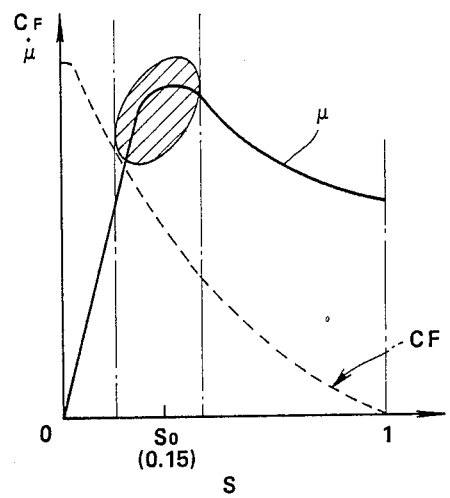
FIG. 7 shows a characteristics of road/tire friction and cornering force in relative to slippage in the differential gear unit.

The differential gear control unit 6 compares the slip rate $S_L$ and $S_R$ with a predetermined slip criterion $S_0$ which is representative of a set slip rate. In the preferred embodiment, the slip criterion $S_0$ is set at 0.15. The set slip rate ($S_0$=0.15) is selected in order to obtain optimum cornering characteristics, as seen from FIG. 7. Namely, at around the slip rate 0.15, the road/tires friction coefficient $\mu$ becomes the maximum. On the other hand, the cornering force CF of the vehicle is maximum while the slip rate is approximately 0. However, in a range as defined by the pair of one-dotted line around the slip rate 0.15 will be still sufficient for maintaining vehicle driving stability. Therefore, by selecting the set slip rate $S_0$ for controlling the slip rate in the differential gear unit at this range, optimum vehicle cornering characteristics can be obtained. In addition, the differential gear control unit 6 detects steering behaviour in excess of a given magnitude based on the steering angle signal $S_\theta$. When the steering behaviour in greater magnitude than the given magnitude, the differential gear control unit 6 detects the inner driven wheel and outer driven wheel based on the steering direction as indicated by the steering angle signal. In general, as will be appreciated, the slip control for the limited-slip differential gear unit 3 is performed to limit slip rate of the outer driven wheel at the set rate, when the slip rate of the outer driven wheel becomes greater than the slip criterion $S_0$.

Figure 8:
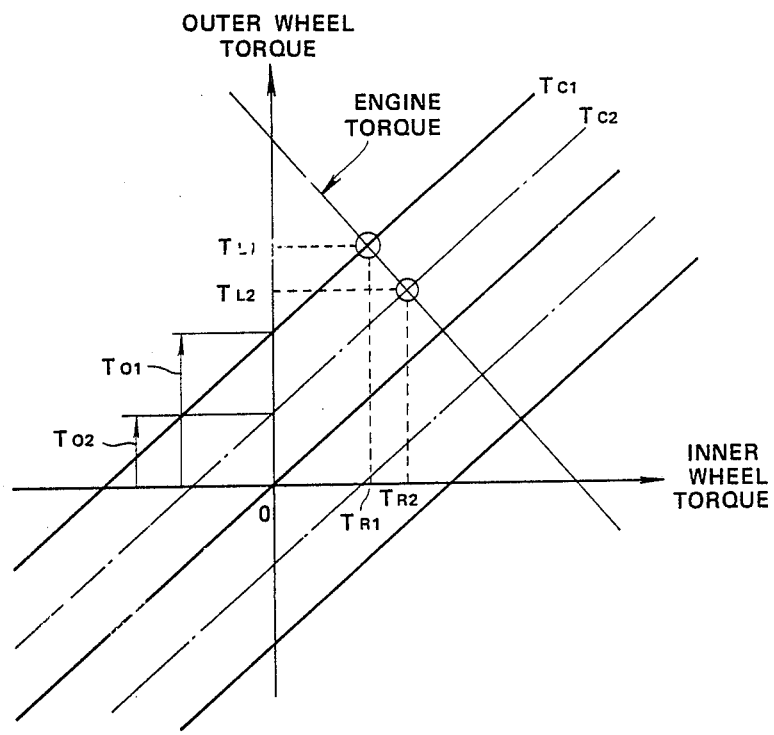
FIG. 8 shows a relationship between a driving torque and slip-limiting torque.

On the other hand, by limiting slip in the differential gear unit 3, the driving torque to be distributed to the inner driven wheel is limited to limit loss of driving torque due to slip at the inner wheel. This, on the other hand, means that the driving torque distribution to the other wheel can be controlled by adjusting driving torque to be lost through the inner wheel. Therefore, when the excessive torque is applied to the outer driven wheel to cause slip ratio $S_R$ at greater magnitude than the set slip ratio $S_0$, slip limitation may be adjusted to lower the slip-limiting torque to increase driving torque loss through the inner driven wheel. Therefore, in the shown embodiment, the slip-limiting torque is lowered from $T_{O1}$ to $T_{O2}$ when slip occurs at the outer driven wheel at greater rate than the set slip rate $S_0$, as illustrated by lines $Tc_1$ and $Tc_2$ in FIG. 8. By this, driving torque distribution to the outer driven wheel is reduced from $TL_1$ to $TL_2$ and to the inner wheel is increased from $TR_1$ to $TR_2$. Therefore, driving torque to be exerted to the outer wheel can be reduced to reduce slip at the outer wheel. When the slip rate $S_R$ at the outer wheel is smaller than the set slip rate $S_0$, the slip-limiting torque may be adjusted from $T_{O2}$ to $T_{O1}$ to increase driving torque distribution to the outer wheel from $TL_2$ to $TL_1$. When the engine torque is excessively greate to cause slip at the outer wheel at greater magnitude than that of the set slip rate even by reducing the slip-limiting torque below a set minimum pressure, then traction control is initiated to adjust the driving torque of the engine or that is transmitted through the power train.

During operation, the traction control system 17 generally performs adjustment of the driving torque from the automotive engine 1 to prevent the excessive driving torque from being distributed to the driven wheels 2a and 2b. The traction control unit 7 thus detects wheel speed higher than a vehicle speed or a vehicle speed representing value to initiate control operation to adjust the driving torque distribution for the driven wheels. As set forth, such traction control systems have been disclosed in the U.S. patent applications Ser. Nos. 918,125, 918,137, 918,080 and 918,081, and the German Patent Application No. P36 34 627.6. As will be appreciated herefrom, while the traction control system is active, the driving torque to be transmitted from the automotive engine is reduced for the purpose of prevention of wheel-spin.

Figure 9:
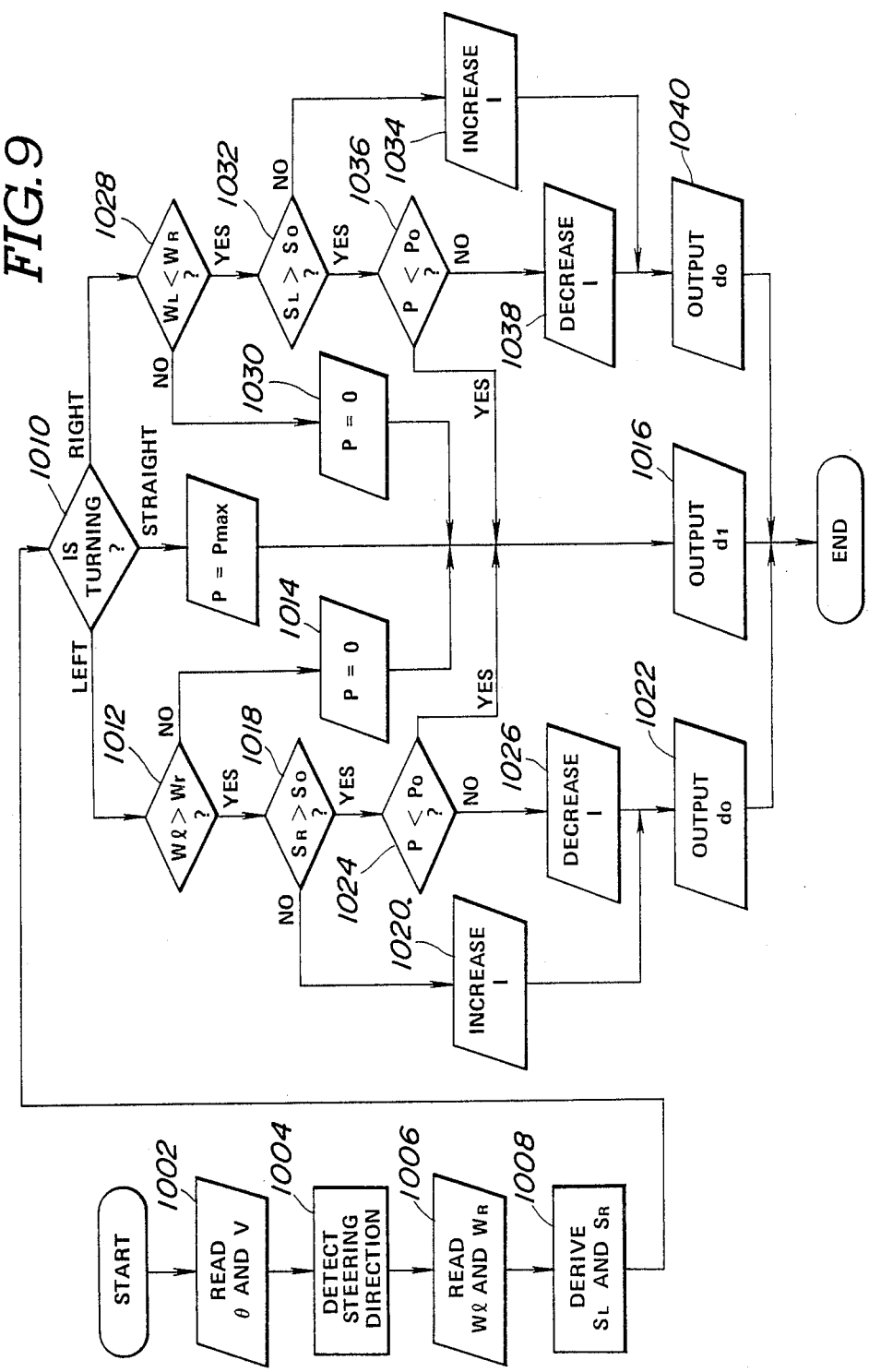
FIG. 9 is a flowchart of a slip-limitation control program to be executed by a control unit in the preferred embodiment of the limited-slip differential gear unit control system.

The preferred control operation to be taken place by the shown embodiment of the limited-slip differential gear control system according to the invention, will be described herebelow with reference to FIG. 9, which shows a slip-limitation control program to be executed by the control unit 6. The shown program is executed cyclically with a given interval.

Immediately after starting execution of the program, the steering angle indicative value $\theta$ of the steering angle signal $S_\theta$ and the vehicle speed indicative value V of the vehicle speed indicative signal $S_v$ are read out, at a step 1002. Based on the steering angle indicative signal value $\theta$, steering direction is detected to identify the inner driven wheel, at a step 1004. At the next step 1006, wheel speed indicative values Wl and Wr of the wheel speed signals $S_{wl}$ and $S_{wr}$ are read out. Thereafter, slip ratios $S_L$ and $S_R$ at respective driven wheels are calculated on the basis of the wheel speed values Wl and Wr and the vehicle speed V, at a step 1008.

At a step 1010, the vehicle travelling direction is checked on the basis of the steering angle signal $S_\theta$. At the step 1010, the judgement is made that whether the vehicle is travelling in straight, through left curve or through right curve. If the vehicle travels in straight as checked at the step 1010, then, the pressure control signal $S_i$ with the maximum electric current $I_{max}$ to adjust the slip-limiting pressure P at maximum value $P_{max}$ so as to provide maximum slip-limitation, at a step 1012. Then, a traction control enabling signal $d_1$ is output at a step 1014. This traction control enabling signal $d_1$ is fed to the traction control unit 7 to perform slip-limiting traction control operation.

On the other hand, when light-hand curving of the vehicle is detected at the step 1012, the wheel speed values Wl and Wr are compared at a step 1018. When the wheel speed Wl at the left wheel (inner wheel) is lower than or equal to the wheel speed Wr of the right wheel (outer wheel), the pressure control signal $S_i$ with minimum electric current representative of the zero value of the slip-limiting pressure P. Therefore, the slip-limiting clutch 104 is substantially released to make the differential gear unit 3 from slip-limitation. Thereafter, the process goes to the step 1014 to output the traction control enabling signal $d_1$.

On the other hand, when the wheel speed Wl at the left wheel is higher than that Wr of the right wheel as checked at the step 1016, the slip ratio $S_R$ of the right wheel is compared with a set ratio $S_0$ at a step 1018. If the slip ratio $S_R$ at the right wheel is smaller than or equal to the set ratio $S_0$, then the pressure control signal $S_i$ is output with a current value I increased by a predetermined magnitude, at a step 1020. By the increased current value I of the pressure control signal $S_i$, the slip-limiting pressure in the multi-plate clutch 104 is increased to increase slip-limitation. Thereafter, a traction control disabling signal $d_0$ is output at a step 1022 to disable wheel slip responsive traction control.

When the slip ratio $S_R$ at the right wheel is greater than the set ratio $S_0$ as checked at the step 1018, the slip-limiting pressure P is compared with a set clutch pressure $P_0$ at a step 1024. If the slip-limiting pressure P is greater than or equal to the set clutch pressure $P_0$, then process goes to the step 1016 to output the traction control enabling signal $d_1$.

When the slip-limiting pressure P is greater than or equal to the set clutch pressure $P_0$ as compared at the step 1024, the pressure control signal $S_i$ with a current value I reduced at a given magnitude is output from the differential gear control unit 6, at a step 1026. Therefore, the slip-limiting pressure to be exerted on the multi-plate clutch 104 is reduced at a given magnitude corresponding to reduction rate of the current value I. Thereafter, the process goes to the step 1022 to output the traction control disabling signal $d_0$ for disabling the wheel slip responsive traction control.

When right-hand curving of the vehicle is detected at the step 1012, the wheel speed values Wl and Wr are compared at a step 1028. When the wheel speed Wr at the right wheel (inner wheel) is lower than or equal to the wheel speed Wl of the left wheel (outer wheel), the pressure control signal $S_i$ with minimum electric current representative of the zero value of the slip-limiting pressure P. Therefore, the slip-limiting clutch 104 is substantially released to make the differential gear unit 3 from slip-limitation. Thereafter, the process goes to the step 1014 to output the traction control enabling signal $d_1$.

On the other hand, when the wheel speed Wr at the right wheel is higher than that Wl of the left wheel as checked at the step 1028, the slip ratio $S_L$ of the right wheel is compared with a set ratio $S_0$ at a step 1030. If the slip ratio $S_L$ at the left wheel is smaller than or equal to the set ratio $S_0$, then the pressure control signal $S_i$ is output with a current value I increased by a predetermined magnitude, at a step 1032. By the increased current value I of the pressure control signal $S_i$, the slip-limiting pressure in the multi-plate clutch 104 is increased to increase slip-limitation. Thereafter, a traction control disabling signal $d_0$ is output at a step 1034 to disable wheel slip responsive traction control.

When the slip ratio $S_L$ at the left wheel is greater than the set ratio $S_0$ as checked at the step 1030, the slip-limiting pressure P is compared with a set clutch pressure $P_0$ at a step 1036. If the slip-limiting pressure P is greater than or equal to the set clutch pressure $P_0$, then process goes to the step 1016 to output the traction control enabling signal $d_1$.

When the slip-limiting pressure P is greater than or equal to the set clutch pressure $P_0$ as compared at the step 1036, the pressure control signal $S_i$ with a current value I reduced at a given magnitude is output from the differential gear control unit 6, at a step 1038. Therefore, the slip-limiting pressure to be exerted on the multi-plate clutch 104 is reduced at a given magnitude corresponding to reduction rate of the current value I. Thereafter, the process goes to the step 1040 to output the traction control disabling signal $d_0$ for disabling the wheel slip responsive traction control.

As will be appreciated herefrom, as long as the steering direction is straight to drive the vehicle in straight, the slip-limiting clutch pressure is held at maximum value for provide maximum slip limitation. This miximize difference of slip ratio between the left and right wheel. At this condition, since the traction control is enabled, the wheel spinning due to excessive torque to be exerted on the driven wheels can be satisfactorily and successfully prevented. Therefore, when vehicle travels in straight substantially high driving stability can be provided. On the other hand, while the vehicle travels through a curve at a speed which will not cause wheel speed difference between left and right driven wheels, the slip-limitation pressure is reduced to zero to allow normal and limitation-free differential operation. This allows the vehicle to smoothly travel through the curve.

When the vehicle travelling speed at the curve is high to cause wheel speed difference between the left and right wheels and when the slip ratio at the outer wheel is not greater than the set pressure, the slip-limiting pressure is increased to reduce the difference of slip ratio between the left and right wheels. Therefore, higher driving torque is distributed to the outer wheel to increase tendency of understeering characteristics for cornering stability. At this time, the traction control is disabled to prevent the engine or the power train from reducing of driving torque to be transmitted to the driven wheels through the differential gear unit. Furthermore, when the slip ratio at the outer wheel is higher than the set ratio and when the slip limiting pressure is not smaller than the set pressure, the slip-limiting pressure is reduced at a given magnitude to allow greater difference of the slip ratio between the left and right wheels. This reduces the driving torque to be distributed to the outer wheel to reduce magnitude of wheel spinning at the outer wheel for assuring the vehicle cornering stability. At this time, since the traction control is disabled, it is avoided to excessively reduce the driving torque to be distributed to the outer driven wheel.

Therefore, the differential gear control system according to the present invention can provide optimum vehicle driving characteristics at any vehicle condition. Thus, the present invention fulfills all of the objects and advantages sought therefor.

What is claimed is:

1. A differential gear control system for an automotive vehicle which facilitates operation of a traction control system for monitoring a vehicular driving condition indicative of vehicle wheel slippage based on preselected control parameters and being responsive to wheel slippage for adjusting driving torque depending upon a magnitude of said wheel slippage, said differential gear control system comprising:

a differential gear unit disposed within a vehicular power train for distributing a driving torque to first and second driven wheels;

a slip-limiting means, associated with said differential gear unit, for adjusting a distribution ratio of drive torque for said first and second wheels, said slip-limiting means varying said distribution ratio of said driving torque according to a slip control signal value;

a steering sensor monitoring steering behavior of a vehicular steering system to produce a sensor signal indicative of a steering direction and a magnitude of steering angular displacement;

a differential gear control means receiving said steering angle signal for identifying first and second driven wheels relative to a curve, in which said first driven wheel is located inside with respect to the curve and said second wheel is located outside with respect to the curve, and producing said slip control signal for adjusting said distribution ratio to set a slip ratio of said second wheel at a given set value when a wheel speed at said first driven wheel is higher than that at said second wheel, said control means being response to said wheel speed at said first wheel being higher than that at said second wheel to output a traction control disabling signal for disabling said traction control system.

2. A differential gear control system as set forth in claim 1, wherein said differential gear control means detects a substantially straight vehicle travelling direction based on said sensor signal and outputs said slip-control signal to set the slip ratio at a maximum ratio in response thereto.

3. A differential gear control system as set forth in claim 1, wherein said differential control means detects a vehicle driving condition wherein the vehicle travels through a curve and the wheel speed at said first wheel is smaller than or equal to that at said second wheel, and outputs said slip control signal for substantially disabling slip-limitation in said differential gear unit in response thereto.

4. A differential gear control system as set forth in claim 1, wherein said differential gear control means detects a slip ratio at said second wheel being smaller than or equal to said set ratio and outputs said slip-control signal to increase slip limitation by a given magnitude in response thereto.

5. A differential gear control system as set forth in claim 1, wherein said slip-limiting means comprises a hydraulic clutch assembly having an adjustable engaging pressure and a hydraulic actuator associated with said hydraulic clutch assembly for adjusting said engaging pressure for controlling said distribution ratio.

6. A differential gear control system as set forth in claim 5, wherein said hydraulic clutch assembly comprises a first clutch interposed between an input shaft of the differential gear unit and a first output shaft for driving one of said driven wheels and a second clutch interposed between said input shaft and a second output shaft for driving the other of said driven wheels, and said first and second clutches are respectively connected to said hydraulic actuator to effect adjustment in said engaging pressure.

7. A differential gear control system as set forth in claim 6, wherein said hydraulic actuator comprises a piston exerting pressure on said first and second clutches for establishing said engaging pressure and a valve means for adjusting fluid pressure exerted on said piston, which valve means is responsive to said slip control signal to adjust said fluid pressure.

8. A differential gear control system as set forth in claim 7, wherein said valve means is connected to a fluid pressure source including a fluid pump which is controlled by said control means.

9. A differential gear control system as set forth in claim 8, wherein said control means controls said fluid pump to be driven only in a predetermined vehicle driving condition which requires operation of said slip-limiting means.

10. A combination comprising:
a traction control system for monitoring a vehicular driving condition indicative of vehicular wheel slippage based on preselected control parameters and being responsive to wheel slippage for adjusting driving torque to driven wheels depending upon a magnitude of said wheel slippage; and
a differential gear control system for an automotive power train which includes:
a differential gear unit disposed within a vehicular power train for distributing a driving torque to first and second driven wheels;
a slip-limiting means, associated with said differential gear unit for adjusting a distribution ratio of drive torque for said first and second wheels, said slip-limiting means providing a variable distribution ratio of said driving torque according to a slip control signal value;
a steering sensor monitoring steering behavior of a vehicular steering system to produce a sensor signal indicative of a steering direction and a magnitude of steering angular displacement;
a differential gear control means receiving said steering angle signal for identifying first and second driven wheels relative to a curve, in which said first driven wheel is located inside with respect to the curve and said second wheel is located outside with respect to the curve, and producing said slip control signal for adjusting said distribution ratio to set a slip ratio of said second wheel at a given set value when a wheel speed at said first driven wheel is higher than that at said second wheel, and said control means being operatively connected with said traction control system and responsive to said wheel speed at said first wheel being higher than that at said second wheel to output a traction control disabling signal to said traction control system for disabling traction control.

* * * * *